(12) United States Patent
Moriuchi et al.

(10) Patent No.: US 7,911,374 B2
(45) Date of Patent: Mar. 22, 2011

(54) RADAR DEVICE AND TARGET DETECTION METHOD

(75) Inventors: Takumi Moriuchi, Kobe (JP); Masahiro Sakaguchi, Kobe (JP); Hisateru Asanuma, Kobe (JP); Tomoya Kawasaki, Toyota (JP); Jun Tsunekawa, Nagoya (JP); Motomi Iyoda, Seto (JP)

(73) Assignee: Fujitsu Ten Limited, Kobe-shi (JP)

( * ) Notice: Subject to any disclaimer, the term of this patent is extended or adjusted under 35 U.S.C. 154(b) by 185 days.

(21) Appl. No.: 12/320,414

(22) Filed: Jan. 26, 2009

(65) Prior Publication Data

US 2009/0189814 A1 Jul. 30, 2009

(30) Foreign Application Priority Data

Jan. 29, 2008 (JP) ................... 2008-017147

(51) Int. Cl.
*G01S 13/60* (2006.01)
*G01S 13/93* (2006.01)
(52) U.S. Cl. .......................... 342/70; 342/146
(58) Field of Classification Search ............... 342/70–72
See application file for complete search history.

(56) References Cited

U.S. PATENT DOCUMENTS

| | | | |
|---|---|---|---|
| 5,422,830 A * | 6/1995 | Post | 348/169 |
| 5,574,463 A * | 11/1996 | Shirai et al. | 342/70 |
| 6,420,997 B1 * | 7/2002 | Cong | 342/70 |
| 6,628,227 B1 * | 9/2003 | Rao et al. | 342/70 |
| 6,862,527 B2 * | 3/2005 | Okamura et al. | 701/301 |
| 7,034,742 B2 * | 4/2006 | Cong et al. | 342/70 |
| 7,391,361 B2 * | 6/2008 | Kishida | 342/109 |
| 7,522,091 B2 * | 4/2009 | Cong et al. | 342/70 |
| 7,579,981 B2 * | 8/2009 | Kishida | 342/109 |
| 2007/0182623 A1 * | 8/2007 | Zeng et al. | 342/174 |
| 2010/0106418 A1 * | 4/2010 | Kindo et al. | 701/300 |

FOREIGN PATENT DOCUMENTS

| | | |
|---|---|---|
| JP | A-09-203780 | 8/1997 |
| JP | A-09-207609 | 8/1997 |
| JP | A-09-211124 | 8/1997 |
| JP | A-2000-057495 | 2/2000 |
| JP | A-2002-175599 | 6/2002 |
| JP | A-2003-173500 | 6/2003 |
| JP | A-2003-233900 | 8/2003 |
| JP | A-2004-101481 | 4/2004 |
| JP | A-2004-132734 | 4/2004 |
| JP | A-2004-233085 | 8/2004 |
| JP | A-2006-189432 | 7/2006 |

* cited by examiner

*Primary Examiner* — Thomas H Tarcza
*Assistant Examiner* — Matthew M Barker
(74) *Attorney, Agent, or Firm* — Oliff & Berridge, PLC

(57) ABSTRACT

A target position is estimated in such a manner to maintain target position continuity, with high accuracy, even when the X coordinate displacement of the target is large. On a scan in which the target position is not detected, when a trajectory of the target in the past is within a predetermined region in the vicinity of the Y-axis, a position for estimate is a position having an X coordinate resulting from shifting, by a first displacement, the X coordinate estimated according to the trajectory, on a basis of the X coordinate of a previous position, while when the trajectory is not within the predetermined region, the position for estimate is a position having an X coordinate resulting from shifting, by a second displacement that is larger than the first displacement, the X coordinate estimated according to the trajectory, on a basis of the X coordinate of a previous position.

8 Claims, 12 Drawing Sheets

Related Art

Related Art

U.S. 7,911,374 B2

RADAR DEVICE AND TARGET DETECTION METHOD

CROSS-REFERENCE TO RELATED APPLICATIONS

This application is based upon and claims the benefit of priority from the prior Japanese Patent Application No. 2008-017147, filed on Jan. 29, 2008, the entire contents of which are incorporated herein by reference.

BACKGROUND OF THE INVENTION

1. Field of the Invention

The present invention relates to a radar device for scanning a predetermined angle range centered on a predetermined reference direction, and to a target position detection method of the radar device. In particular, the present invention relates to a radar device and a target detection method of the same, the radar device having: a target position detection unit which detects the position of a target within the angle range, on an XY coordinate plane having the reference direction as the Y-axis and a direction perpendicular to the reference direction as the X-axis, for each scanning; and a target position estimation unit which, on a scan in which the target position is not detected, estimates a position for detection in the scan on the basis of a first position of the target detected previously and a second position detected after the detection of the first position.

2. Description of the Related Art

Known vehicle control systems include systems for performing collision response control by way of an on-vehicle radar device that scans ahead of a cruising vehicle, to predict collision with a vehicle ahead and, thereupon, accelerate/decelerate the vehicle and/or activate safety devices.

The on-vehicle radar device in such vehicle systems transmits and receives frequency-modulated radar signals over a predetermined angle range centered on a reference direction in front of the radar device, by electronic scanning or mechanical scanning. The transmission and reception signals are analyzed by an information processing device, such as a microcomputer, provided in the on-vehicle radar device, to detect the relative speed, the relative distance and the angle of direction of the target, as well as the position of the latter within the scan plane. On the basis of these detection results, the ECU (Electronic Control Unit) of the vehicle predicts a collision and controls thereupon various actuators of the vehicle.

In scanning by an on-vehicle radar device, both the target and the radar device are moving at high speeds. As a result, the angles of the reflection surfaces of the target change from moment to moment relative to the radar signals. The level of the reception signals exhibits therefore variation, and thus high-reliability detection results cannot be always obtained. For this reason, the on-vehicle radar device determines continuity between detection results, in order to ensure the reliability of the detection results on each scan.

FIG. 1 is a diagram for explaining a continuity determination process by an on-vehicle radar device. In FIGS. 1A and 1B, a radar device 10 installed in a vehicle 1 scans the road ahead of the vehicle over a predetermined angle ($\alpha$) about a reference direction F that corresponds to the vehicle forward face. In FIGS. 1A and 1B, the black circles P-1, P-2, ... P-n represent the positions of a target detected on one scan (n denotes the scan count), while the solid arrows represent shifts in the position of the target.

The radar device 10 stores the target positions, sequentially detected through continuous scanning, in a memory of an information processing device. For each scan, the radar device 10 determines continuity on the basis of the displacement from the target position on a previous scan to the target position at the current scan, and determines that there is continuity when the displacement lies within a predetermined range. When the radar device 10 determines that there is continuity over a predetermined number of consecutive times (for instance three times), the radar device outputs the latest target position, together with information such as relative velocity and the like, to an ECU of the vehicle 1.

For instance, when in FIG. 1A the radar device 10 acknowledges continuity for three consecutive times, between the target positions P-1 and P-2, P-2 and P-3, and P-3 and P4, the radar device 10 outputs the latest target position P-4. The radar device 10 outputs thereafter target positions P-5, P-6, P-7, ... each time that continuity is acknowledged in the same way.

In the above process, reception signals of sufficient level may fail to be received, and so the target position is not detected (the target is lost). FIG. 1B illustrates one such example, where the target is lost on the third scan. The count of continuity determination times, following on positions P-1 and P-2, is then reset, restarting at the moment that position P-4 is detected on the fourth scan. Position P-7 becomes then the earliest position for which there is acknowledged three-times continuity, which is the determination count required for output, whereupon start of the collision response control becomes delayed in proportion. This control delay increases the risk of collision when the target follows a gradually approaching trajectory, as illustrated in FIG. 1B.

Therefore, the on-vehicle radar device estimates the target position on scans where the target is lost, to maintain thereby continuity between an estimated position and a newly detected position when the target position is detected again. Doing so allows preventing delay in the output of the target position caused by a break in the continuity determination count. Japanese Unexamined Patent Application Publication No. 2004-233085 discloses an example of an on-vehicle radar device where such an estimation is carried out.

FIG. 2 is a diagram for explaining a method for target position estimation. FIG. 2 illustrates an instance in which, after acknowledging continuity between detected target positions P-1, P-2, the target is lost on the third scan, whereupon a target position P-3 is estimated for this scan. In FIG. 2, the target position is depicted on an XY plane where the Y-axis corresponds to a reference direction F ahead of the vehicle 1, the X-axis corresponds to a direction perpendicular thereto, and the origin is the position of the radar device 10.

Firstly, the radar device 10 determines a displacement $\Delta x1$ of the X coordinate and a displacement $\Delta y1$ of the Y coordinate between positions P-1 and P-2 of the target.

In the case of a forward monitoring radar, the target to be monitored is a vehicle ahead. Therefore, the Y coordinate of the target undergoes a comparatively large shift owing to, for instance, increases and decreases in relative speed. Motion of the target in the X-axis direction, however, is at most about that of a lane change, and thus displacement of the X coordinate is comparatively small. Taking $\Delta x1$ as a displacement when the X coordinate shifts substantially as a result of a lane change or the like, it is very likely that position Pd, which results from shifting the target position P-2 by $\Delta x1$ in the X-axis direction and by $\Delta y1$ in the Y-axis direction, will shift considerably beyond the actual target position in the X-axis direction.

Suppose now that after an estimation using position Pd as position P-3, the target is lost also on the next fourth scan and the position thereof is estimated (position Pd2), with position P-5 being detected then on the next fifth scan. In that case, target position Pd2 obtained through repeated estimations diverges then substantially from the detected target position P-5, and thus it is judged that there is no continuity between positions Pd2 and P-5, and the estimation of target position becomes meaningless.

In the above example, therefore, the radar device 10 for forward monitoring estimates position P-3 to be the position having an X coordinate shifted by 0.3 times the displacement $\Delta x1$, from the X coordinate of position P-2, and having a Y coordinate shifted by the displacement $\Delta y1$ from the Y coordinate of position P-2. The radar device 10 estimates position P-4 in the same way, using the displacement $\Delta x11$ of the X coordinate from positions P-2 to P-3. Doing so restricts the displacement of the estimated position in the X-axis direction, and allows hence estimating a position close to the actual target position, such that continuity with the estimated position P-4 is maintained, with high accuracy, when position P-5 is detected.

Recent years have witnessed a growing demand for vehicle control systems that can prevent so-called crossing collisions that occur when an own vehicle enters an intersection at the same time as another vehicle that cruises in a direction perpendicular to the travel direction of the own vehicle. However, there are limits to the angle range that can be detected by radar devices, either relying on mechanical scanning or electronic scanning. It is therefore difficult to detect the position of another vehicle that is cruising in a direction perpendicular to the travel direction of the own vehicle using a radar device for forward monitoring alone. Methods have been proposed therefore in which the arrangement of the on-vehicle radar device is such that the reference direction is a direction oblique to the vehicle, so as to allow monitoring ahead and to the sides of the vehicle.

As illustrated in FIG. 3, however, for instance the displacement $\Delta X31$ of the X coordinate of the target is greater than in the case of forward monitoring, with the Y-axis being now the right-oblique forward reference direction Fd facing ahead of the vehicle, and the X-axis the direction perpendicular to the reference direction Fd. As a result, the problems below arise when the target position is lost.

FIG. 4 is a diagram for explaining a method for target position estimation when a radar device for forward monitoring is used for forward-lateral monitoring of vehicles. In the figure, the Y-axis corresponds to the right-oblique forward reference direction Fd of the vehicle. FIG. 4 illustrates an instance in which the target is lost on the third scan, after acknowledging continuity between detected target positions P-1, P-2, whereupon a target position P-3 is estimated. Estimation of position P-3 is carried out in accordance with the same method as in the case of forward monitoring illustrated in FIG. 2, by reducing the displacement of the X coordinate. In the case of forward-lateral monitoring, however, the target position changes considerably in the X-axis direction, and hence the displacement $\Delta x2$ of the X coordinate from position P-1 to position P-2 is greater than the displacement $\Delta x1$ of the X coordinate in FIG. 2. As a result, it is highly probable that the estimated position P-3 and the actual position diverge substantially in the X-axis direction. Even if the target position P-4 is detected on the immediately succeeding scan, the divergence between the estimated target position P-3 and the detected target position P-4 is substantial, so it is highly probable that continuity is not acknowledged. Output of detection results becomes delayed as a result.

SUMMARY OF THE INVENTION

It is therefore an object of the present invention to provide a radar device and a target position detection method that allows maintaining continuity of a target position with high accuracy, even when the X coordinate displacement of the target is large.

In order to achieve the above goal, a first aspect of the present invention is a radar device for scanning a predetermined angle range centered on a predetermined reference direction, having: a target position detection unit which detects a position of a target within the angle range, on an XY coordinate plane having the reference direction as a Y-axis and a direction perpendicular to the reference direction as an X-axis, for each scanning; and a target position estimation unit which, on a scan in which the target position is not detected, obtains a trajectory of the target on the basis of a first position of the target detected previously and a second position detected after the detection of the first position, and estimates a position having an X coordinate shifted by a first displacement from the X coordinate of the second position to be a position for detection on the scan when the trajectory is within a predetermined region in the vicinity of the Y-axis, and estimates a position having an X coordinate shifted by a second displacement larger than the first displacement from the X coordinate of the second position to be a position for detection by the scan when the trajectory is not within the predetermined region.

In a preferred embodiment of the above aspect, the target position estimation unit performs the estimation using a position detected or estimated previously as the first or second position.

In the above aspect, the target position estimation unit estimates the position detected on the scan to be a position having an X coordinate shifted from the X coordinate of the second position by a first displacement when the trajectory of the target is within a predetermined region in the vicinity of the Y-axis, and to be a position having an X coordinate shifted by a second displacement larger than the first displacement when the trajectory is not within a predetermined region in the vicinity of the Y-axis. Therefore, positions can be estimated with a reduced displacement when the X coordinate displacement of the target is small, and with a greater displacement when the X coordinate displacement of the target is large.

In forward-lateral monitoring, specifically, target trajectories that have a high probability of resulting in a crossing collision exhibit a pattern in which the target approaches along the Y-axis, i.e. the reference direction, in the vicinity thereof, and a pattern in which the target approaches with an angle of direction that deviates from the reference direction, depending on the combination of the speeds and travel distances of the own vehicle and another vehicle. In the former case, the X coordinate displacement is small. During position estimation when the target is lost, therefore, continuity can be maintained, once the target is detected again, by reducing the X coordinate displacement. In the latter case, by contrast, the X coordinate displacement is large, and hence continuity can be maintained, once the target is detected again, by estimating the target position increasing the X coordinate displacement. Continuity of the target position can be maintained with high accuracy as a result in both cases. Collision response control can thus be carried out fast, without delay in target position output, when the probability of a crossing collision is high.

In the above preferred embodiment, the target position estimation unit performs the estimation using a position detected or estimated in the past as the first or second position. Continuity can be maintained therefore even if the target position is lost on a plurality of consecutive scans. This allows reducing the likelihood of a break in continuity when the target is detected again, and allows preventing thus delay in the output of detection results.

DESCRIPTION OF THE PREFERRED EMBODIMENTS

Embodiments of the present invention are explained below with reference to accompanying drawings. The technical scope of the present invention, however, is not limited to these embodiments, and includes the subject matter set forth in the claims as well as equivalents thereof.

Figure 5:
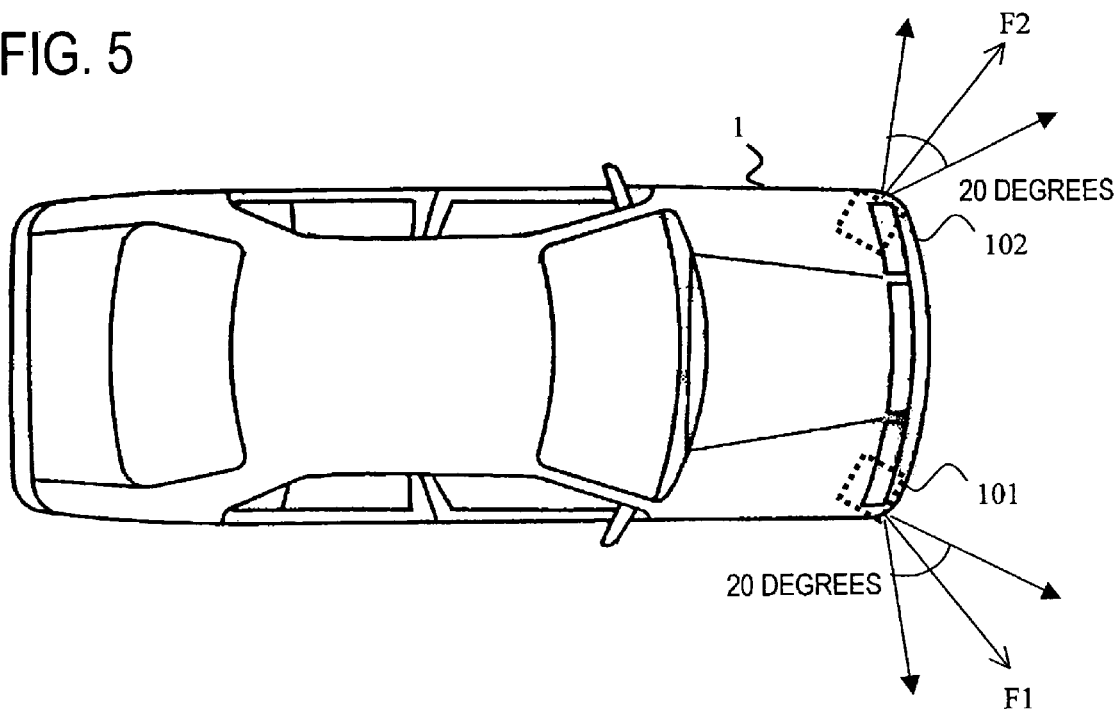
FIG. 5 illustrates an example of a radar device of an embodiment, installed in a vehicle.

FIG. 5 illustrates an example of a radar device of the present embodiment installed in a vehicle. The radar device 101 (102) is provided in the vicinity of the bumper right end (left end) of the front bumper of a vehicle 1. Through a radome, the radar device emits radar signals and receives reflected signals over a predetermined angle (some 20 degrees) about a 45-degree direction F1 (or F2) to the right (or left) on the front F of the vehicle 1. The explanation below focuses on an example of the radar device 101, but applies equally to the radar device 102, by reversing the left-right direction.

Figure 6:
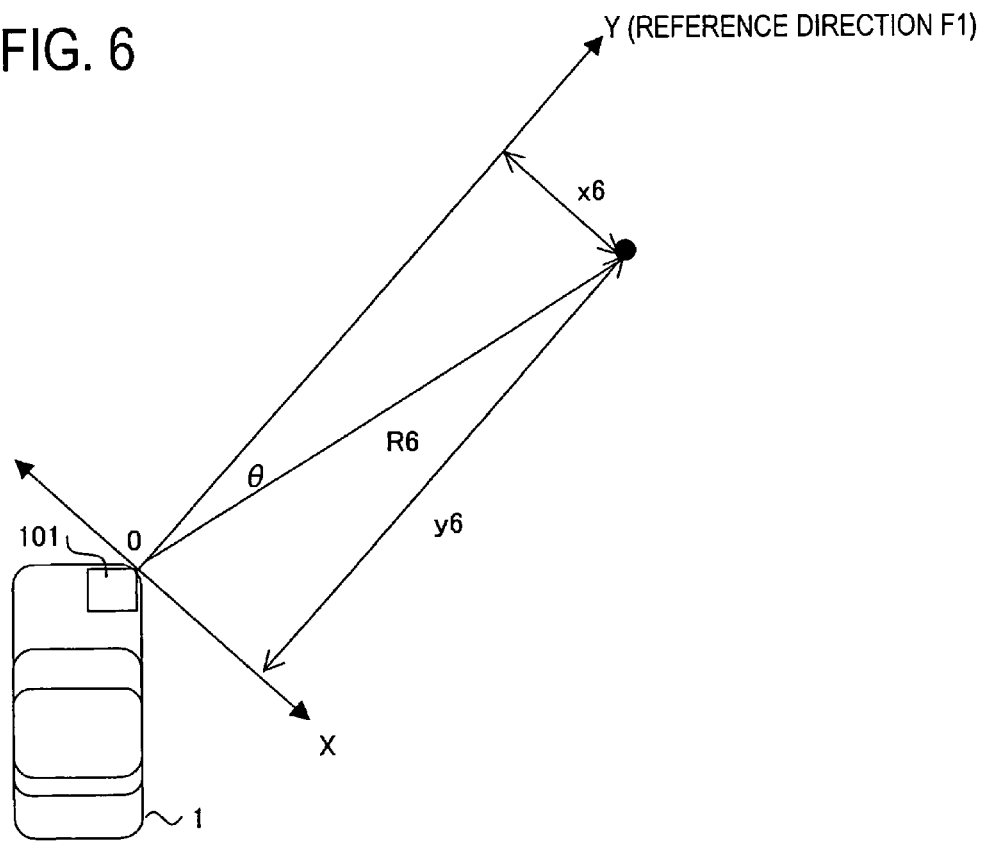
FIG. 6 is a diagram for explaining a plane of coordinates of the embodiment.

In the present embodiment, the position of the target is the position on an XY coordinate plane in which the reference direction F1 is the Y-axis, the direction perpendicular thereto is the X-axis, and the radar device 101 stands at the origin, the target position being determined by the X coordinate, the Y coordinate and the angle of direction, which is the angle $\theta$ of the target relative to the Y-axis (0 degrees), as illustrated in FIG. 6. The X coordinate x6 and the Y coordinate y6 of the target is calculated as $x6 = R6 \cdot \sin \theta$, $y6 = R6 \cdot \cos \theta$ on the basis of the relative distance R6 and the angle of direction $\theta$ of the target.

Figure 7:
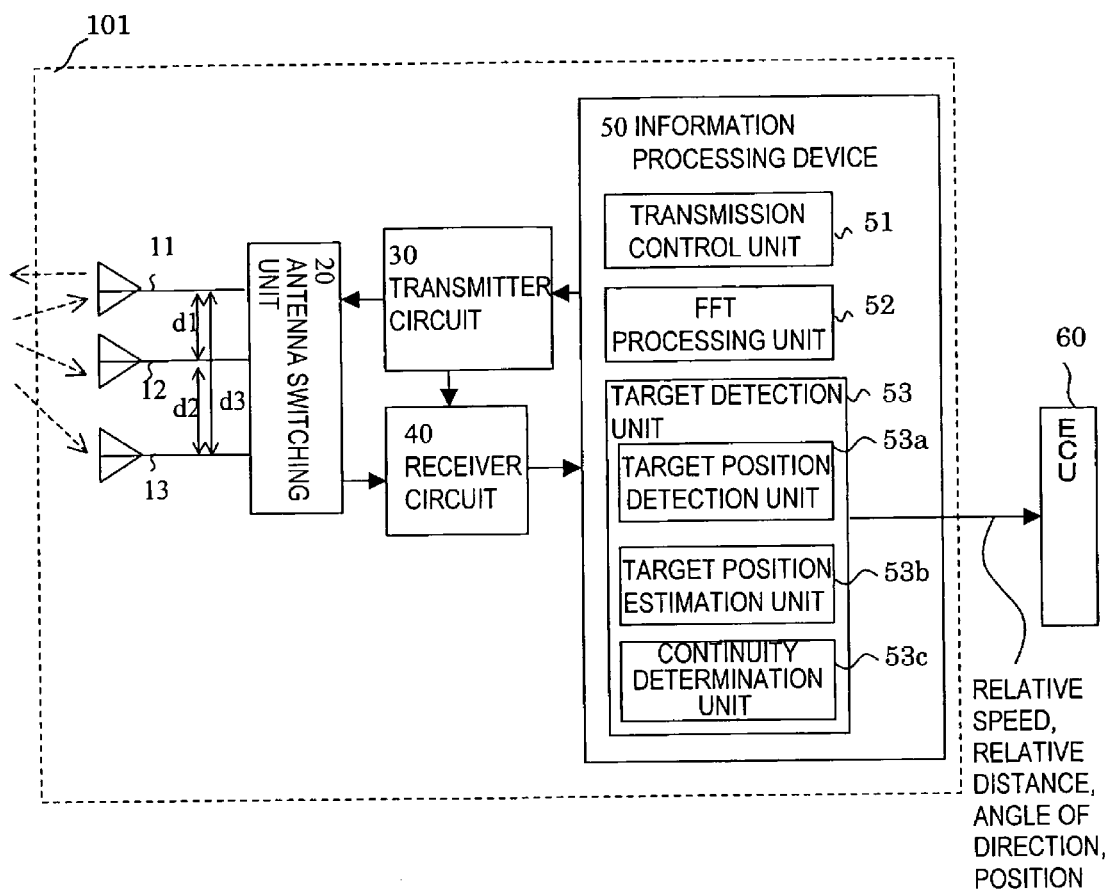
FIG. 7 illustrates a configuration example of a radar device 101 of the embodiment.

FIG. 7 illustrates a configuration example of the radar device 101 of the present embodiment. The radar device 101 is an electronic scanning-type radar device for scanning over an angle $\alpha$. The radar device 101 sends radar signals that are frequency-modulated by FM-CW (frequency-modulated continuous-wave) and receives reflected waves reflected by a target by way of a plurality of antennas. The radar device 101 has a scanning unit comprising a transmitter circuit 30, an antenna switching unit 20, antennas 11, 12, 13, a receiver circuit 40, and an information processing unit comprising an information processing device 50 for processing data obtained on the basis of scanning results.

Figure 8:
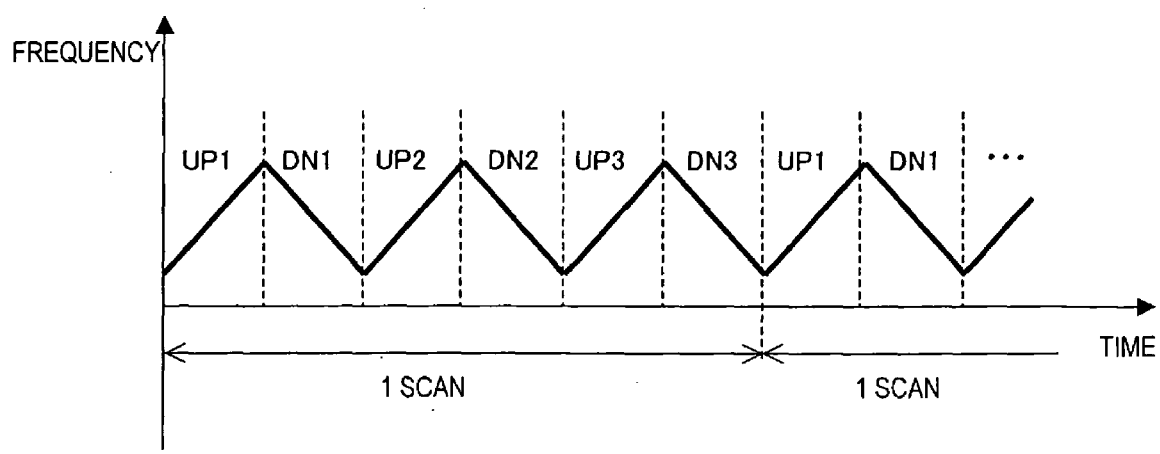
FIG. 8 is a diagram for explaining frequency modulation of a transmission signal of the radar device 101.

The transmitter circuit 30 generates triangular-wave frequency-modulated radar signals in which rise intervals and fall intervals alternate with each other repeatedly. FIG. 8 illustrates the relationship between time and frequency of the radar signals. The frequency of the radar device signal increases gradually, in linear fashion, at rise intervals UP1, UP2, . . . , and decreases gradually, in linear fashion, at fall intervals DN1, DN2, . . . . A cycle of intervals from the rise interval UP1 to the fall interval DN3 is repeated. Part of such radar signals is branched and inputted into the receiver circuit 40, while another part is inputted into the antenna switching unit 20.

While performing time-division transmission and reception of radar signals by way of the antenna 11, the antenna switching unit 20 sequentially switches electrically three antenna pairs comprising each two of the antennas 11, 12, 13, whereby reflected signals are received by each antenna pair. Specifically, switching is performed at the start of each rise interval, in such a way that one antenna pair corresponds for one pair of rise interval and fall interval of the radar signal illustrated in FIG. 8. That is, the antenna pairs are switched between an antenna pair comprising antennas 11, 12, at the rise interval UP1 and the fall interval DN1, an antenna pair comprising antennas 11 and 13 at the rise interval UP2 and the fall interval DN2, and an antenna pair comprising antennas 12, 13, at the rise interval UP3 and the fall interval DN3. The antenna pairs are repeatedly switched in the same way for subsequent intervals. Each antenna pair receives a radar signal reflected by the target, as a reception signal, at a respective interval. The antennas 11, 12, 13 are disposed in such a manner that the gaps d1, d2, d3 between the antennas are all dissimilar. A phase difference in the reception waves arises as a result among the antenna pairs, depending on the respective antenna gaps. This phase difference is used for calculating the angle of direction of the target in accordance with the below-described processing.

Herein, one scan corresponds to one cycle over which the three antenna pairs receive reception waves. In the example of FIG. 8, specifically, one scan corresponds to one cycle from the rise interval UP1 to the fall interval DN3. On each scan, thus, the antenna switching unit 20 inputs the reception signals from respective antenna pairs into the receiver circuit 40.

For each scan, the receiver circuit 40 mixes the reception signal inputted from the antenna switching unit 20 and the radar signal inputted from the transmitter circuit 30, i.e. mixes part of a transmission wave. The reception signal, undergoing Doppler shift on account of relative speed of the target and the time delay arising from the relative distance to the target, has a frequency difference vis-á-vis the transmission signal. As a result of mixing there is generated thus a frequency difference signal that corresponds to the frequency difference of the transmission and reception signals. The receiver circuit 40 inputs this frequency difference signal into the information processing device 50. The frequency of the frequency difference signal is used for calculating the relative distance and relative speed of the target in accordance with a below-described process.

The information processing device 50 comprises a microcomputer having, for instance, a CPU for performing computations in accordance with various processing programs, a ROM for storing the programs, and a working-space RAM. The various units of the information processing device 50 explained next are realized by way of a processing program for the operation of each unit, and by way of a CPU that runs in accordance with the processing programs.

A transmission control unit 51 issues to the transmitter circuit 30 an instruction to the effect of generating a frequency-modulated radar signal, and causes the antenna switching unit 20, via the transmitter circuit 30, to switch between antenna pairs at a timing corresponding to the modulation interval of the radar signal. An FFT (fast Fourier transform) processing unit 52 performs A/D conversion of the frequency difference signal inputted from the receiver circuit 40, and subjects the data thus obtained to FFT processing, to analyze thereby the frequency of the frequency difference signal and the phase difference of the reception waves for each of the above-described antenna pairs. On the basis of the results of the FFT process, a target detection unit 53 detects the relative distance, relative speed, angle of direction and position of the target, for each scan, in accordance with the below-described procedure, acknowledges continuity in the detection results, and outputs then the detection results to an ECU 60 of the vehicle 1.

Figure 9:
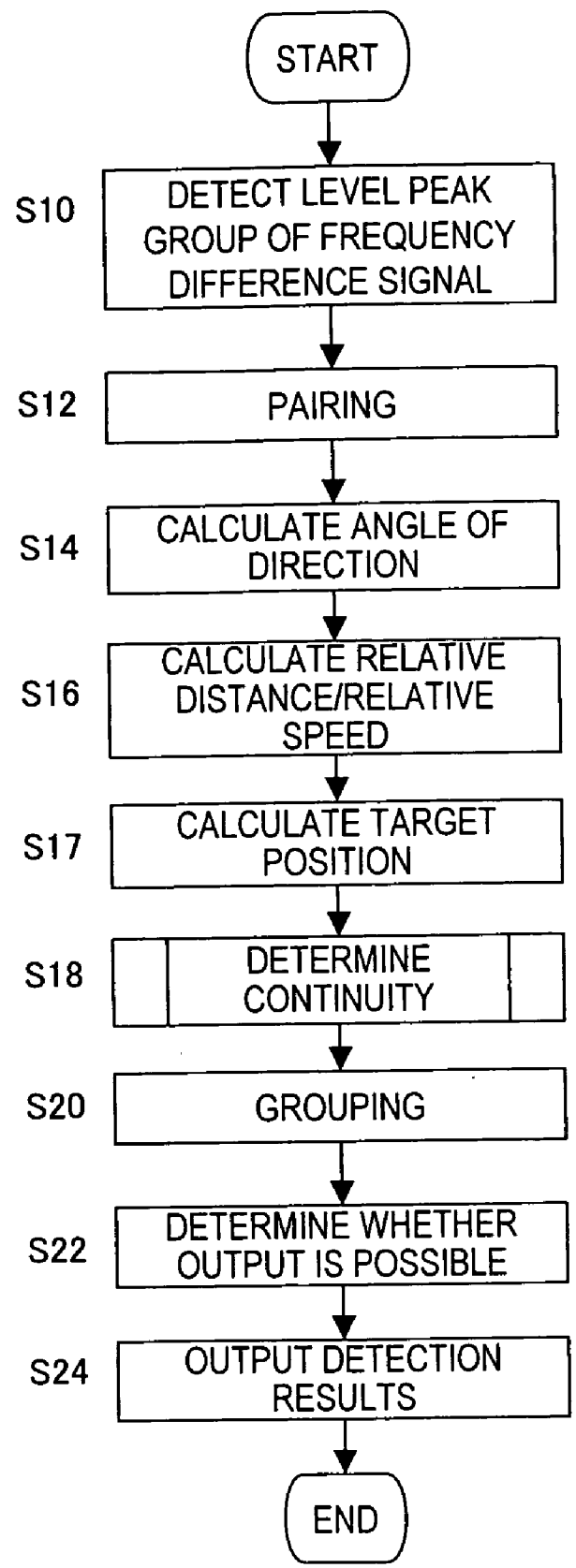
FIG. 9 is a flowchart diagram for explaining a procedure in a target detection unit 53.

FIG. 9 is a flowchart diagram for explaining a procedure in the target detection unit 53. The procedure illustrated in FIG. 9 is executed for each scan.

On the basis of the FFT process results, the target detection unit 53 detects the frequency spectrum of the frequency difference signal at the frequency rise interval and frequency fall interval of the radar signal, and detects a level peak group of the spectrum (S10). The target detection unit 53 performs pairing (mapping) between the maximum levels of the detected level peak group of the rise interval and the fall interval (S12). Through this pairing there are mapped the frequencies of the frequency difference signal of each rise interval and fall interval, that are required for calculating the relative distance and the relative speed of the target. Herein, one pair of pairing results corresponds to one target.

Once pairing is over, the target detection unit 53 calculates the angle of direction of the target, for each pairing result, on the basis of phase differences of the reception waves at the three antenna pairs (S14). The target detection unit 53 calculates a plurality of angle of direction candidates for the phase difference of the reception wave of each antenna pair. As a result, the target detection unit 53 extracts a plurality of the most similar candidates from each candidate, and used a representative value of the candidates, for instance an average, as the detected angle of direction.

For each pairing result, the target detection unit 53 calculates the relative distance and the relative speed of the target on the basis of a frequency denoting a maximum level at the rise interval and the fall interval of the radar signal (S16).

The target detection unit calculates the target position on the basis of the angle of direction and the relative distance of the target, as illustrated in FIG. 6, and stores the target position in the RAM of the information processing device 50 (S17). Accordingly, the target detection unit 53 that performs the procedure S17 corresponds to the "target position detection unit 53a".

The target detection unit 53 judges then whether there is continuity between the target position detected on a previous scan and the target position detected on a current scan (S18). The target detection unit 53 that performs the procedure S18 corresponds to the "continuity determination unit 53c". When the target is lost, the target detection unit 53 estimates then the position in accordance with the procedure of a below-described subroutine. Accordingly, the target detection unit 53 that performs such a procedure corresponds to the "target position estimation unit 53b".

When plural detection results are obtained from a single target, the target detection unit 53 performs a grouping process of combining the detection results, to generate thereby a detection result of a single target (S20). The target detection unit 53 judges then whether or not there can be outputted detection results such as the position, angle of direction, relative speed, relative distance and so forth of the target, which has been judged to have continuity for no fewer than a predetermined number of times on the basis of continuity history (S22). The target detection unit 53 outputs then the detection results to the ECU 60 of the vehicle 1 (S24).

Figure 10:
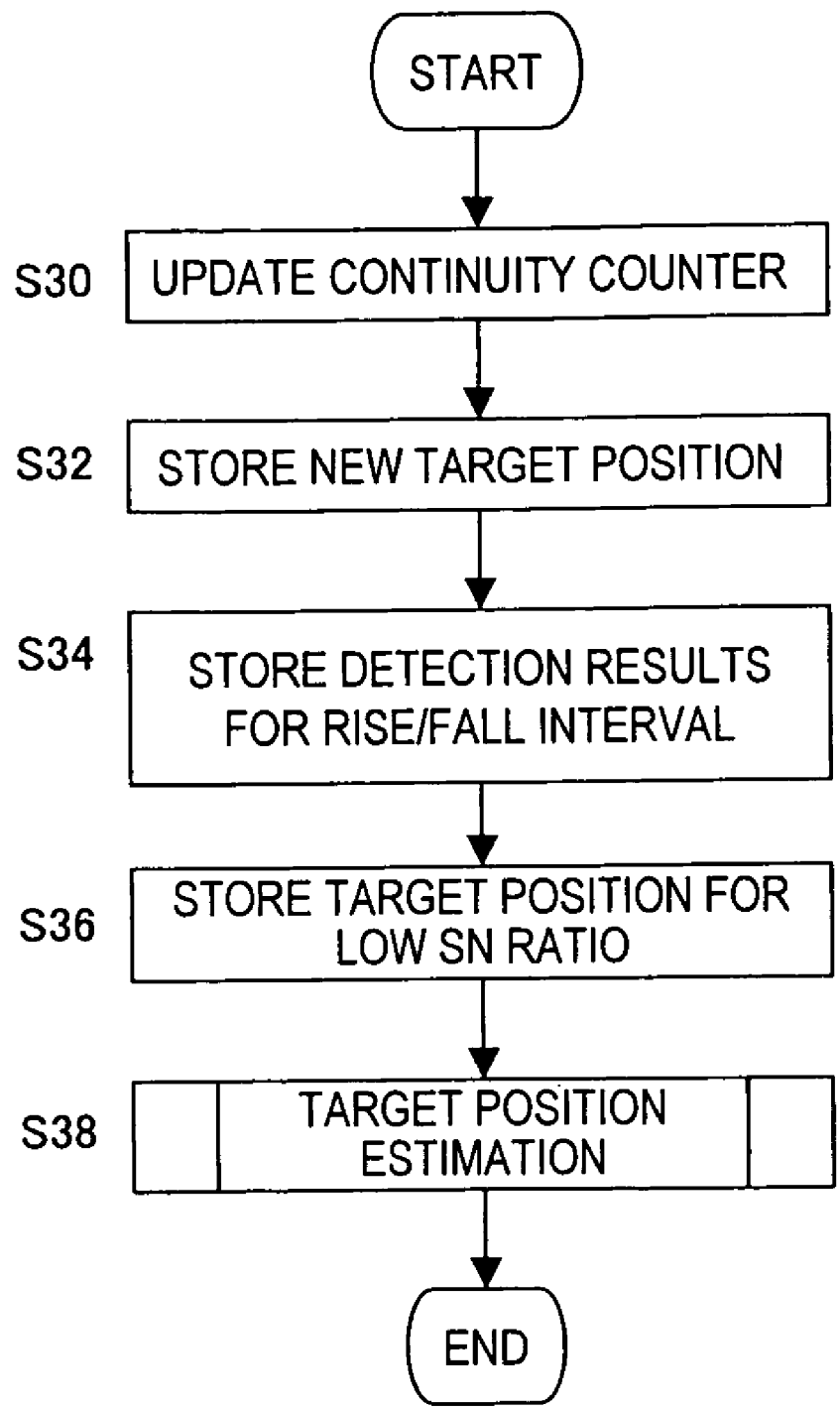
FIG. 10 is a flowchart diagram for explaining a continuity determination procedure in the target detection unit 53.

FIG. 10 is a flowchart diagram for explaining a continuity determination procedure in the target detection unit 53. The procedure of FIG. 10 corresponds to the procedure S18 of FIG. 9.

The target detection unit 53 determines continuity by comparing the target position detected on a previous scan with the target position detected on a current scan, and updates the value of a continuity counter, which is a counter variable for each target (S30). The target detection unit 53 determines that there is continuity if the displacement between two positions falls within a predetermined range. The continuity counter is incremented when there is continuity and decremented when there is no continuity. The number of times that it is determined that there is continuity, i.e. the count value of the continuity counter, is stored in the RAM of the information processing device 50.

The target detection unit 53 stores in the RAM a new target position for which continuity has not been acknowledged in the past, and starts the count of the continuity counter for that target (S32).

The target detection unit 53 cannot detect relative speed or position when the level peak of the frequency difference signal is detected on the basis of only the rise interval or the fall interval of the frequency of the transmission signal. Therefore, the target detection unit 53 stores the result in the RAM without updating the continuity counter (S34). When a target position is detected based on a reception signal for which no good SN ratio can be obtained, the target detection unit 53 stores the result in the RAM without updating the continuity counter, since the reliability of the detection result is insufficient (S36).

When the target position is not detected on the basis of both the rise interval and the fall interval of the frequency of the transmission signal, the target detection unit 53 judges that the target is lost, and executes the target position estimation procedure (S38).

The target position estimation procedure of the present embodiment is explained next. In the present embodiment, the radar device 101 monitors another vehicle cruising in a direction perpendicular to the travel direction of the vehicle 1, and outputs the target position of the other vehicle to the ECU of the vehicle 1. The ECU 60 determines the probability of a crossing collision, and performs the appropriate collision response control. By estimating the position of a lost target in accordance with the following procedure, the target detection unit 53 of the radar device 101 of the present embodiment prevents breaks of continuity in the target position, in particular when the probability of a crossing collision is high. Delay in the output of detection results can be prevented thereby, which is effective for enabling a speedy collision response control.

Figure 11A:
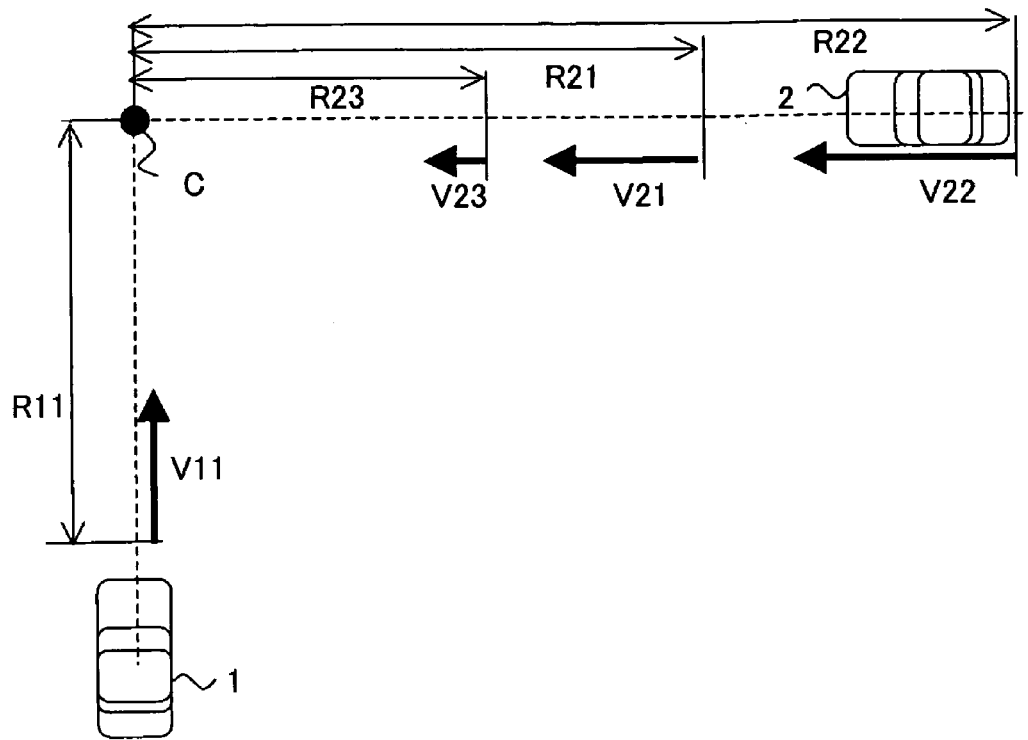
FIG. 11 is a diagram for explaining the trajectory of a target in an instance of crossing collision.
Figure 11B:
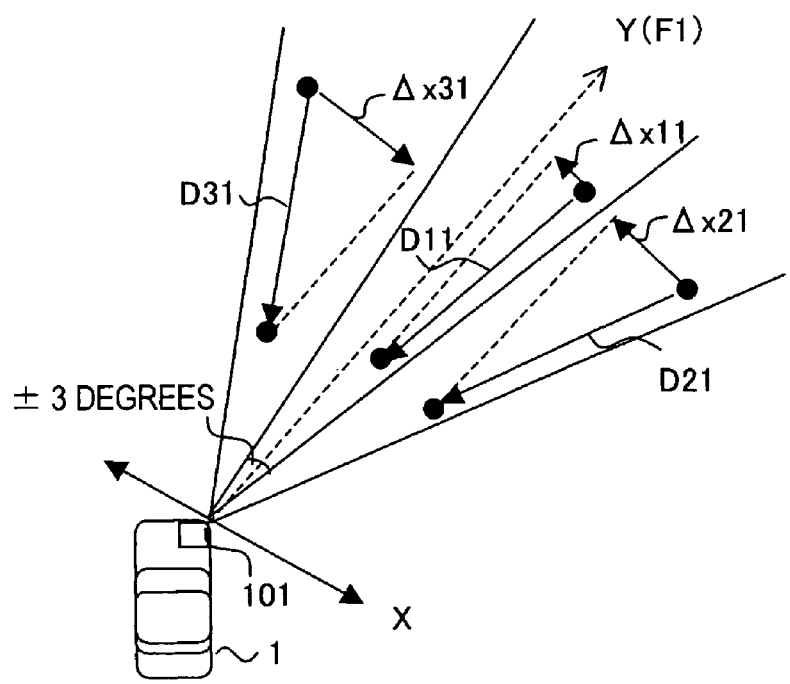

Specifically, FIG. 11A illustrates the motion of an own vehicle and another vehicle in a crossing collision situation, and FIG. 11B illustrates the target positions detected in such an instance. As illustrated in FIG. 11A, an own vehicle 1 and another vehicle 2 traveling in a direction perpendicular to the travel direction of the own vehicle 1 enter into a crossing C. In such an instance, when the speed V11 of the own vehicle 1 and the speed V21 of the other vehicle 2 are substantially identical, and the travel distance R11 of the own vehicle 1 and the travel distance R21 of the other vehicle 2 are substantially identical, the shift of the position of the other vehicle 2 follows an approaching trajectory, such as trajectory D11 of FIG. 11B, substantially along the reference direction F1 at 45 degrees ahead and to the right of the own vehicle 1, i.e. substantially along the Y-axis. The displacement $\Delta x11$ of the X coordinate is comparatively small in trajectory D11. When the target is lost in this situation, performing an estimating with a reduced X coordinate allows preserving continuity between the estimated position and a position detected anew, as in the case of forward monitoring.

When the speed V22 of the other vehicle is greater than the speed V11 of the own vehicle, and when the travel distance R22 of the other vehicle 2 is greater than the travel distance R11 of the own vehicle 1, the shift of the position of the other vehicle 2 follows an approaching trajectory D21 in a direction having a positive angle of direction. The displacement $\Delta x21$ of the X coordinate of trajectory D21 is now greater than the displacement $\Delta x11$ for trajectory D11.

When the speed V23 of the other vehicle is smaller than the speed V11 of the own vehicle, and when the travel distance R23 of the other vehicle 2 is smaller than the travel distance R11 of the own vehicle 1, the shift of the position of the other vehicle 2 follows an approaching trajectory D31 in a direction having a negative angle of direction. The displacement $\Delta x31$ of the X coordinate of trajectory D31 is now greater than the displacement $\Delta x11$ for trajectory D11.

Figure 1A:
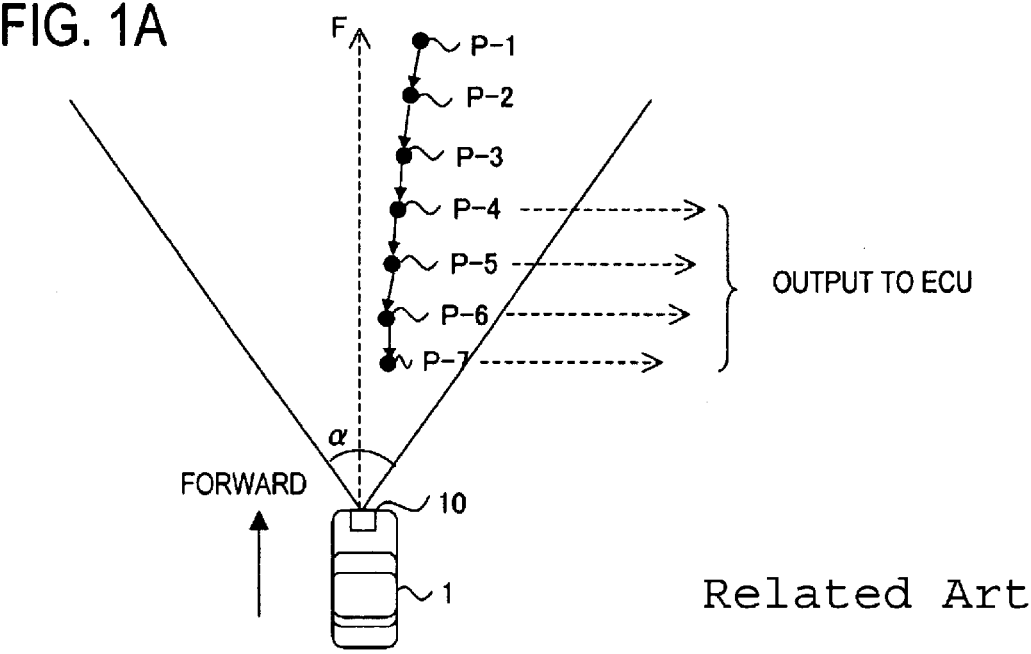
FIG. 1 is a diagram for explaining a continuity determination process by an on-vehicle radar device.
Figure 1B:
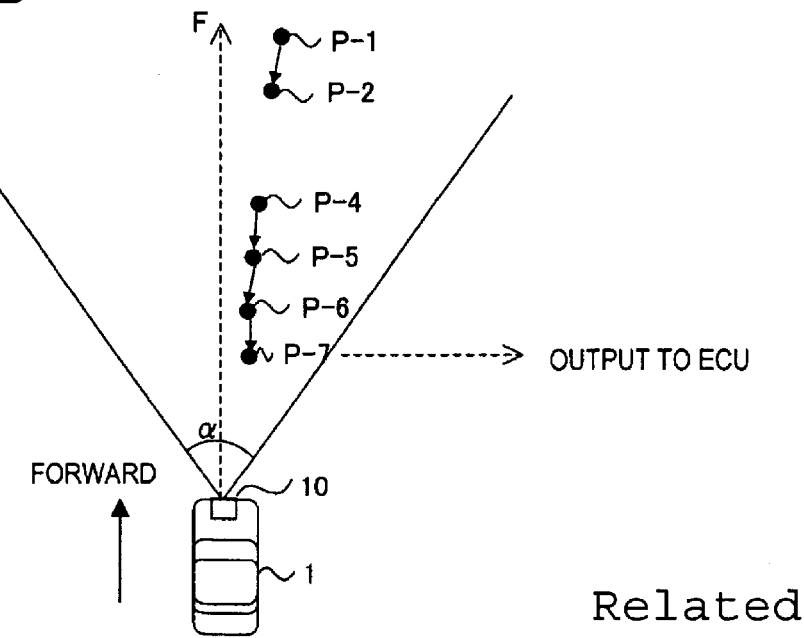
Figure 2:
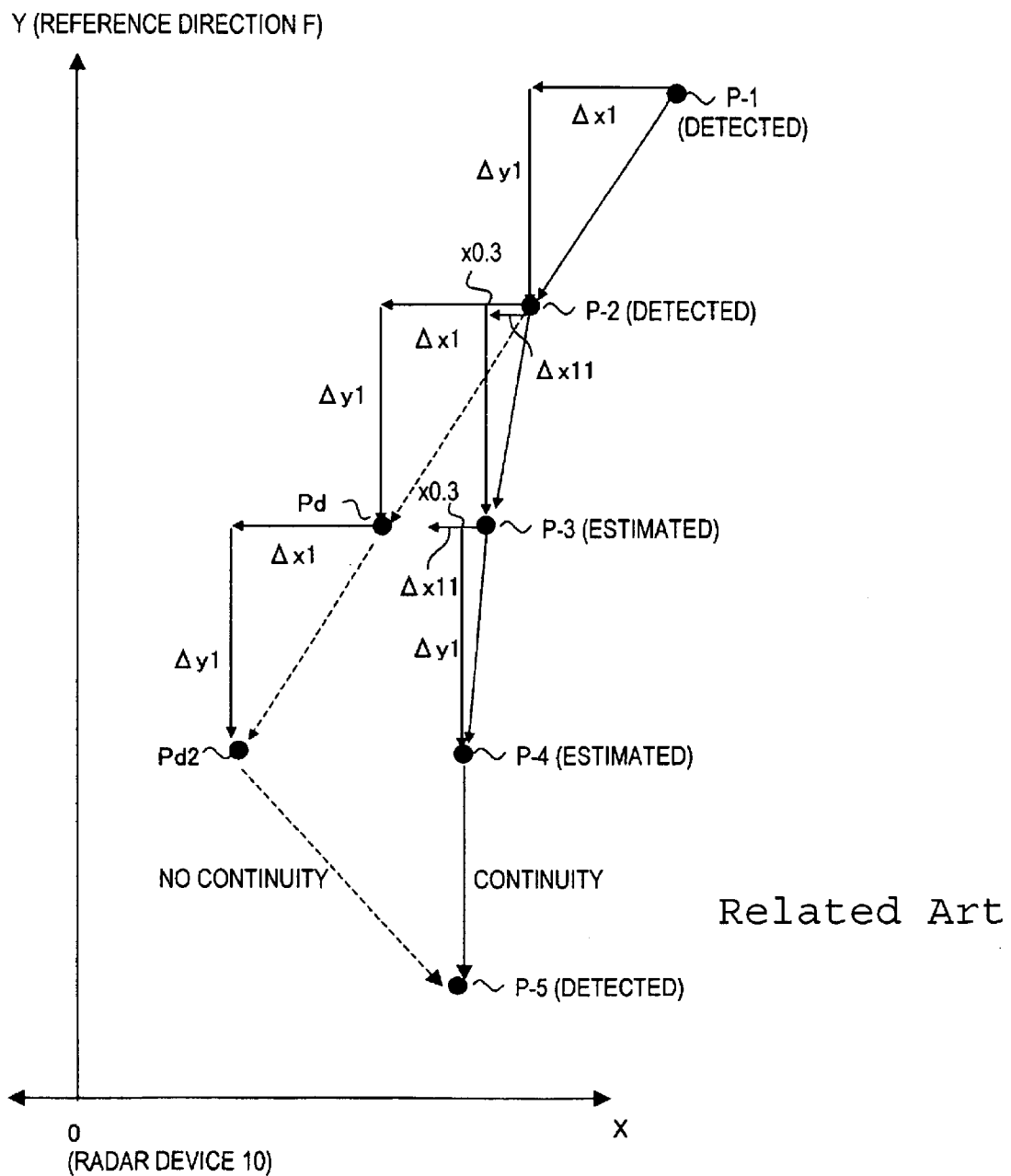
FIG. 2 is a diagram for explaining a method for target position estimation.
Figure 3:
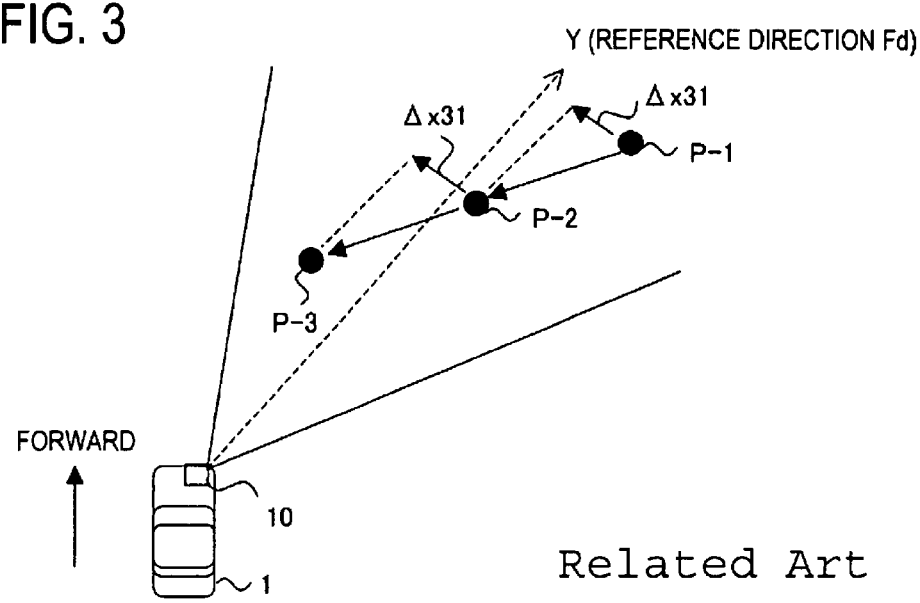
FIG. 3 is a diagram for explaining target shift in forward-lateral monitoring.
Figure 4:
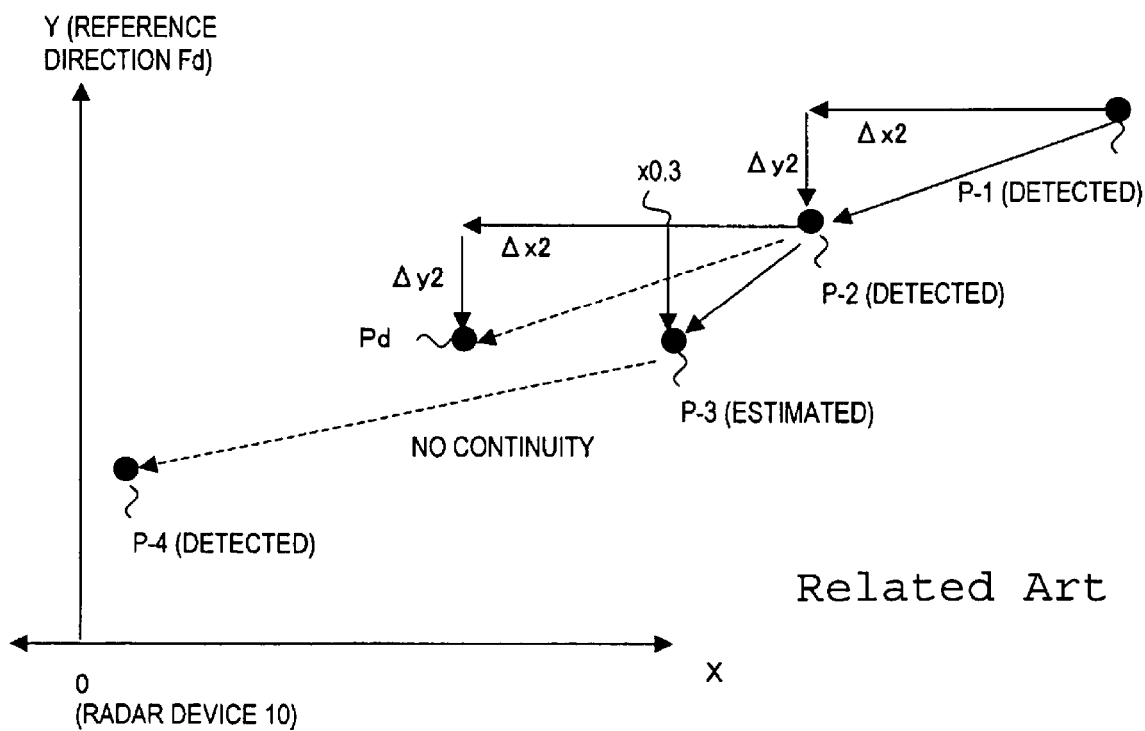
FIG. 4 is a diagram for explaining a method for target position estimation when a radar device for forward monitoring is used for forward-lateral monitoring ahead of a vehicle.

In the case of trajectory D21, therefore, when the shift of the position of the vehicle 2 follows a trajectory such as trajectory D21 of trajectory D31, and estimation is performed with a reduced X coordinate displacement, the new position at the point in time where the target is detected again and the estimated position may diverge considerably in the X-axis direction, as illustrated in FIG. 3, so that there may occur a continuity break.

In the present embodiment, therefore, the radar device 101 performs position estimation with a reduced X coordinate displacement, as in forward monitoring, when there is observed a trajectory such as trajectory D11 within a predetermined region in the vicinity of the Y-axis, for instance within an angle of ±3 degrees. When a trajectory is observed outside this region, namely a trajectory such as the approaching trajectories D21 or D31 in an angle of direction greater than ±3 degrees, the radar device 101 performs position estimation with an increased X coordinate displacement.

Figure 12:
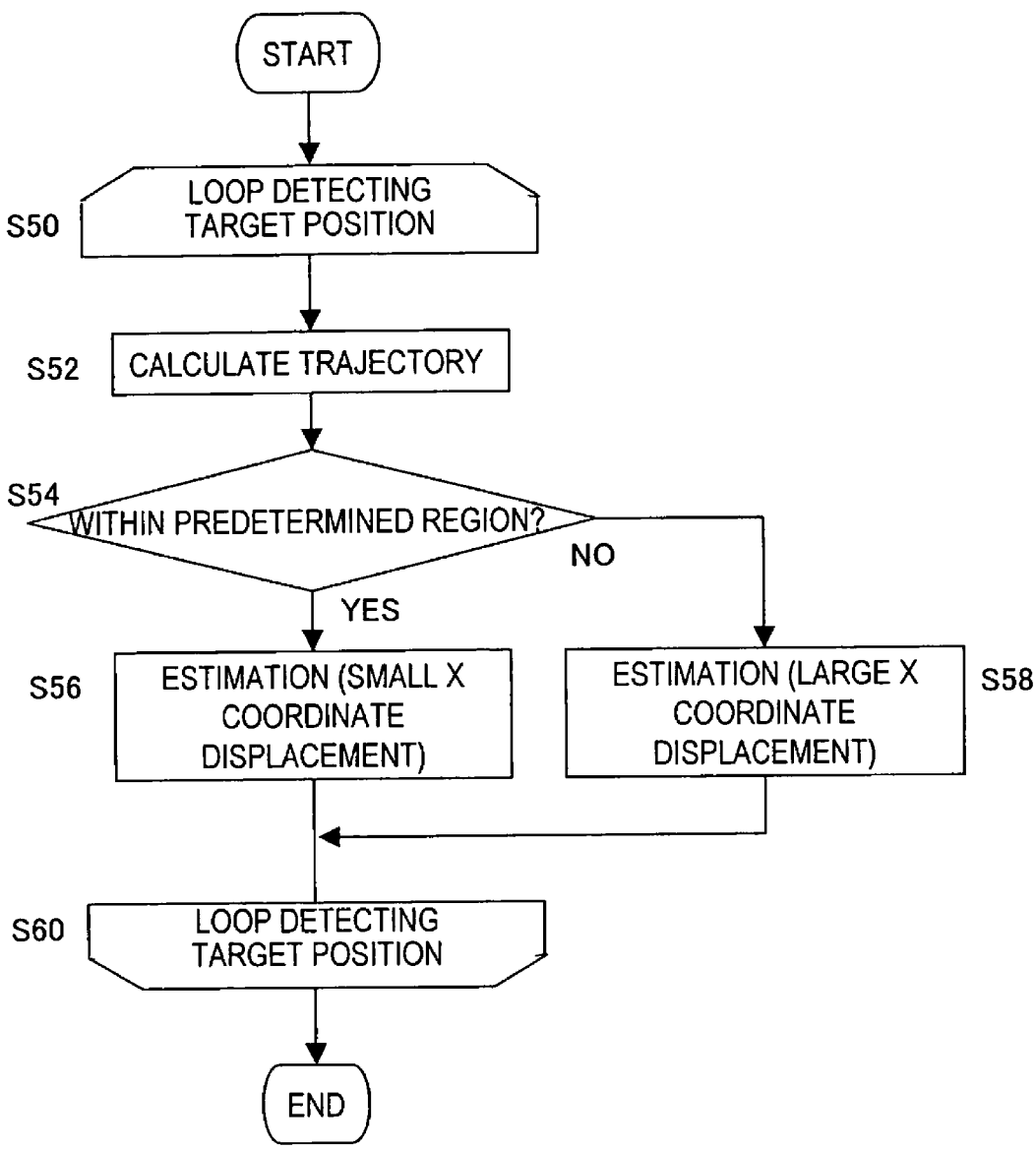
FIG. 12 is a flowchart for explaining a target position estimation procedure by the target detection unit 53.

FIG. 12 is a flowchart for explaining the target position estimation procedure by the target detection unit 53. The procedure of FIG. 12 corresponds to the procedure S38 of FIG. 10.

Regardless of the previous scan, the target detection unit 53 performs the following process for all lost targets on the current scan (S50, S60). The target detection unit 53 calculates the trajectory of the target on the basis of the target position on the previous scan and the target position on the last-but-one scan (S52). The trajectory of the target is represented by the X coordinate displacement and the Y coordinate displacement of the previous target position and the last-but-one target position.

The target detection unit 53 determines whether the trajectory lies within a predetermined angle range (±3 degrees) in the vicinity of the Y-axis. In the example of the FIG. 11B, trajectory D11 lies within the predetermined angle range, while trajectories D21, D31 do not. Therefore, the target detection unit 53 performs on trajectory D11 the X coordinate estimation processing illustrated in FIG. 13, in accordance with the procedure S56.

Figure 13:
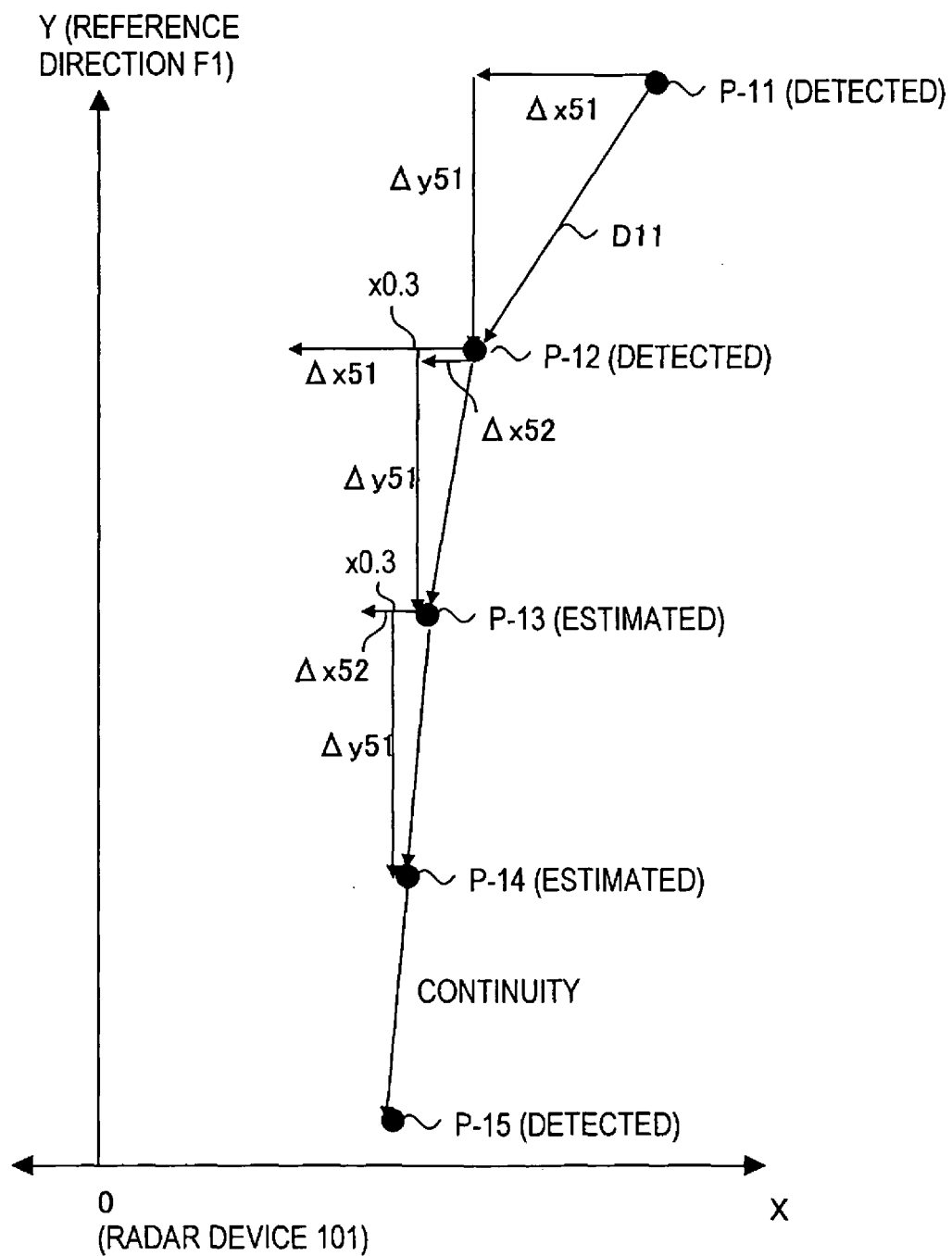
FIG. 13 is a diagram for explaining a target position estimation process in which the displacement of the X coordinate is small.

FIG. 13 illustrates an example in which there is acknowledged continuity between a last-but-one target position P-11 and a previous target position P-12 and there is estimated the target position P-13 lost on the current scan.

Firstly, the target detection unit 53 obtains the X coordinate displacement $\Delta x51$ and the Y coordinate displacement $\Delta y51$ from position P-11 to position P-12. The trajectory from position P-11 to position P-12 corresponds to D11. The target detection unit 53 estimates position P-13 to be the position having an X coordinate shifted by 0.3 times the displacement $\Delta x51$, from the X coordinate of position P-12 of the target, and having a Y coordinate shifted by the displacement $\Delta y51$ from the Y coordinate of position P-12.

The target detection unit 53 estimates position P-14, lost on the next scan, in accordance with the same method, using now the X coordinate displacement $\Delta X52$ from position P-12 to position P-13. The displacement of the estimated position in the X-axis direction is reduced thereby, which allows estimating a position close to the actual target position, such that continuity with the estimated position P-14 is maintained, with high accuracy, when position P-15 is detected on the next scan.

Figure 14:
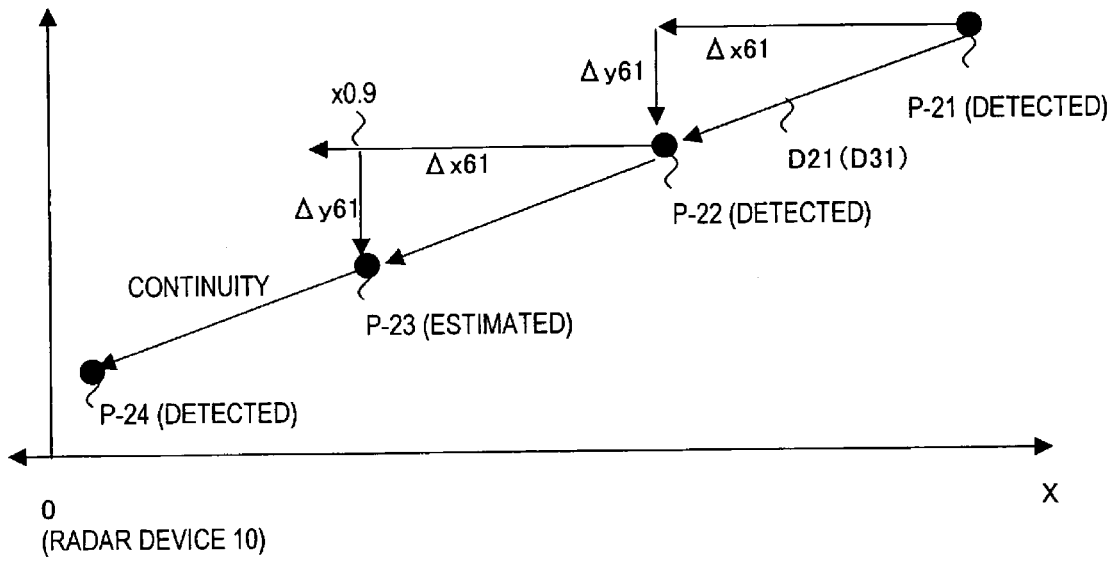
FIG. 14 is a diagram for explaining a target position estimation process in which the displacement of the X coordinate is large.

Meanwhile, the target detection unit 53 performs, on trajectory D21 or D31, the X coordinate estimation processing illustrated in FIG. 14, in accordance with the procedure S58.

FIG. 14 illustrates an example in which there is acknowledged continuity between a last-but-one target position P-21 and a previous target position P-22 and there is estimated a target position P-23 lost on the current scan. Firstly, the target detection unit 53 obtains the X coordinate displacement $\Delta x61$ and the Y coordinate displacement $\Delta y61$ from position P-21 to position P-22. The trajectory from position P-21 to position P-22 corresponds to D21 or D31.

The target detection unit 53 estimates position P-23 to be the position having an X coordinate shifted by 0.9 times the displacement $\Delta x61$, from the X coordinate of position P-22 of the target, and having a Y coordinate shifted by the displacement $\Delta y61$ from the Y coordinate of position P-22. The displacement of the estimated position in the X-axis direction can be increased thereby, which allows estimating a position close to the actual position of the target. Continuity with the estimated position P-23 can be maintained as a result, with high accuracy, when position P-24 is detected on the next scan.

When a trajectory is observed at a predetermined region in the vicinity of the Y-axis, thus, the target detection unit 53 performs position estimation with a reduced X coordinate displacement, as in forward monitoring. When a trajectory is observed outside this region, the target detection unit 53 performs position estimation with an increased X coordinate displacement. This results in high-accuracy continuity when the target is detected again.

Figure 15:
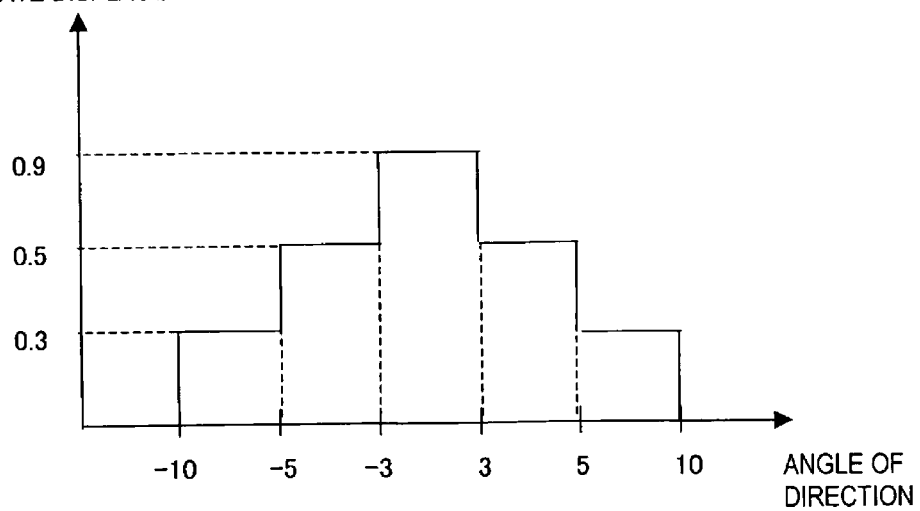
FIG. 15 is a diagram for explaining the relationship between a coefficient for determining the X coordinate of an estimated position, and an angle of direction that encompasses the trajectory.

The coefficient that multiplies the X coordinate displacement corresponding to a trajectory is not limited to the above coefficients, and need only be a coefficient such that the X coordinate displacement for a trajectory distant from the Y-axis is greater than the X coordinate displacement for a trajectory near the Y-axis. Alternatively, the coefficient may be determined dynamically in accordance with the angle range that encompasses the trajectory, as illustrated in FIG. 15.

Thus, the target detection unit 53 estimates a lost target position and determines on the next scan that this position has continuity as a position detected on the previous scan. The position on the current scan can thus be estimated on the basis of the estimation results on the previous scan, even if the target is lost on consecutive scans. Continuity can thus be maintained as a result. This results in high-accuracy continuity when the target is detected again.

Besides position displacements, the target detection unit 53 may also use displacements of relative distances as criteria for determining continuity in accordance with the above-described procedure. In addition to the lost target position, the target detection unit 53 may also estimate in this case the relative distance of the target on the basis of the X coordinate and the Y coordinate of the target position, estimated as described above. For instance, the relative distance can be calculated, according to the Pythagorean theorem, as the square root of the sum of the square of the estimated X coordinate and the square of the estimated Y coordinate.

In the above-described examples the radar device is mounted on an automobile. However, the present embodiment can also be used in radar devices mounted in mobile objects other than automobiles. The radar device, moreover, is not limited to an electronic scanning-type radar, and thus the present embodiment applies also to a mechanical scanning-type radar device.

As explained above, the radar device 101 of the present embodiment allows performing target position estimation in such a manner that target position continuity is maintained with high accuracy, even when the X coordinate displacement of the target is large.

What is claimed is:

1. A radar device for scanning a predetermined angle range centered on a predetermined reference direction, comprising:
    a target position detection unit which detects a position of a target within the angle range, on an XY coordinate plane having the reference direction as a Y-axis and a direction perpendicular to the reference direction as an X-axis, for each scanning; and
    a target position estimation unit which, on a scan in which the target position is not detected, obtains a trajectory of the target on the basis of a first position of the target detected previously and a second position detected after the detection of the first position, and estimates a position having an X coordinate shifted by a first displacement from the X coordinate of the second position to be a position for detection by the scan when the trajectory is within a predetermined region in the vicinity of the Y-axis, and estimates a position having an X coordinate shifted by a second displacement larger than the first displacement from the X coordinate of the second position to be a position for detection by the scan when the trajectory is not within the predetermined region.

2. The radar device according to claim 1, wherein the target position estimation unit estimates a position using a position detected or estimated previously as the first or second position.

3. The radar device according to claim 2, which is mounted on a mobile object, the reference direction being a direction oblique to a travel direction of the mobile object.

4. The radar device according to claim 1, further comprising a continuity determination unit which counts the number of times that displacements of a plurality of positions detected or estimated previously lie within a predetermined range, and outputs a detected position when the count value reaches a prescribed value.

5. The radar device according to claim 4, which is mounted on a mobile object, the reference direction being a direction oblique to a travel direction of the mobile object.

6. The radar device according to claim 1, which is mounted on a mobile object, the reference direction being a direction oblique to a travel direction of the mobile object.

7. A target detection method comprising the steps of:
    radar scanning a predetermined angle range centered on a predetermined reference direction;
        detecting a position of a target within the angle range, on an XY coordinate plane having the reference direction as a Y-axis and a direction perpendicular to the reference direction as an X-axis, for each scanning; and
        obtaining, on a scan in which the target position is not detected, a trajectory of the target on the basis of a first position of the target detected previously and a second position detected after the detection of the first position, and estimating a position having an X coordinate shifted by a first displacement from the X coordinate of the second position to be a position for detection on the scan when the trajectory is within a predetermined region in the vicinity of the Y-axis, and estimating a position having an X coordinate shifted by a second displacement larger than the first displacement from the X coordinate of the second position to be a position for detection on the scan when the trajectory is not within the predetermined region.

8. The target detection method according to claim 7, wherein in the step of estimating a position of the target, a position is estimated by using a position detected or estimated previously as the first or second position.

* * * * *